United States Patent [19]

Yukevich, Jr.

[11] Patent Number: 5,051,763
[45] Date of Patent: Sep. 24, 1991

[54] CAMERA WITH ORIENTING FLASH

[76] Inventor: John P. Yukevich, Jr., 308 Church Ln., Sewickley, Pa. 15143

[21] Appl. No.: 602,115

[22] Filed: Oct. 23, 1990

[51] Int. Cl.⁵ .............................................. G03B 15/05
[52] U.S. Cl. ................................ 354/132; 354/145.1; 354/415
[58] Field of Search ...................... 354/415, 145.1, 132

[56] References Cited

U.S. PATENT DOCUMENTS

| | | | |
|---|---|---|---|
| 3,648,104 | 3/1976 | Ackerman et al. | 354/415 |
| 4,285,588 | 8/1981 | Mir | 354/137 |
| 4,299,464 | 11/1981 | Cushman | 354/137 |
| 4,349,260 | 9/1982 | Ishida et al. | 354/145 |
| 4,354,141 | 10/1982 | Takeistu | 315/241 |
| 4,573,786 | 3/1986 | Tanguchi et al. | 354/416 |
| 4,608,522 | 8/1986 | Yuasa et al. | 315/241 |

OTHER PUBLICATIONS

Hytec/Hyman Products Inc., "Smile Machine" Item #A0136, P.O. Box 1749, Mayland HTS. MO. 63043, 1989.

Nikan Inc., Teletouch 300, Promoteal Material Oympus Optical Co. Ltd., Infinity Zoom 200, Promotional 1990.

Primary Examiner—Michael L. Gellner

[57] ABSTRACT

A camera with two separate electronic flash devices. The first flash device is incorporated for the purpose of gaining the attention and thereby orienting the attention of the subject person or persons being photographed and the second flash device is incorporated for the purpose of illuminating a human subject or subjects in synchronization with exposure of the film.

7 Claims, 3 Drawing Sheets

CAMERA WITH ORIENTING FLASH

BACKGROUND OF THE INVENTION

1. Field of the Invention.

This invention relates generally to the field of photography, and more particularly to improvements in photographic devices for recording still pictures with artificial illumination.

2. Description of Prior Art.

In cameras which incorporate a flash device that device has primarily served the functions of illuminating the subject of the photography in synchrony with the exposure of the film. Other functions, such as providing a preliminary flash of light to gauge and regulate the amount of light provided simultaneously with exposure of the photographic film have been disclosed. For an example, see U.S. Pat. No. 3,648,104 issued to Robert Bosch Photokino, GmbH. Additionally, prior art has disclosed electronic flash devices and apparatus which fire preliminary flashes of light to minimize the so called "Red Eye" effect. See U.S. Pat. No. 4,285,588 issued to Eastman Kodak Company and U.S. Pat. No. 4,299,464 issued to Eastman Kodak Company. Recently, Olympus Optical Company, Ltd. introduced a camera, the Infinity Zoom 200, which contains a flash device which is capable of firing a series of pulsing pre-flashes immediately prior to the firing of the main flash in synchrony with the automatic exposure of film for the purpose of mitigating against the "Red Eye" effect.

It is well known that one of the problems associated with photography in general and flash photography in particular has been obtaining the attention of the subject person or subject persons at the moment when the photographer causes the film to be exposed to the light emanating from the image of the person or persons being photographed. Commonly, photographers ask their subject to say a word (e.g. cheese, underwear) in order to inform them that their picture is about to be taken. Individuals often attempt to gain the attention of children and infants by similar means by using objects such as toys to orient the child or infant toward the camera.

Anyone who has tried the above mentioned methods with infants or young children who do not comprehend the nature of such prompting or with groups of individuals where extraneous noise or conversation exist has encountered both difficulty and failure in orienting the gaze of his subject or the gaze of all of his subjects toward himself and the camera. Often, after employing the above mentioned methods as means of orienting his subject or subjects toward the camera, the photographer causes the film within his camera to be exposed to the image of his subject or subjects at a time when his subject's gaze is not directed towards the camera or when one or more persons, in a group, are not directing their gaze toward the camera. This has resulted in what will be termed the "Lost Picture" phenomenon.

When the lost picture phenomenon occurs, the photographer who seeks a picture wherein his subject or subjects are gazing at him and his camera does not achieve this objective until shortly after the flash fires. When the flash has fired and the subject or subjects gaze or gazes become oriented toward the camera, the electronic flash device of camera is incapable of immediately generating a second flash which the photographer could utilize for the illumination of the image or images of his subject or subjects in synchrony with the exposure of film within his camera. Within the limits of time that it takes for all cameras with electronic flash devices heretofore known to recycle so as to be capable of generating a subsequent flash that attention of the subject or subjects is likely to have been lost again.

Prior art has not revealed any photographic device for recording still pictures which incorporates an electronic flash device which would allow a photographer to emit any preliminary flash or flashes that would be capable of gaining the attention of a human subject without triggering a mechanism that will result in the exposure of photographic film within the camera. As well, prior art has not revealed any electronic flash devices which by and of themselves would provide one photographer with the ability to fire a flash of light from such a unit while holding a camera within a fixed plane of view in order to obtain a still photograph of a human subject or subjects whose gaze has become oriented towards the camera as a result of the flash of light from the independent electronic flash device without the assistance of a tripod to stabilize the physical location of the camera with a fixed plane or without the assistance of an other human being for the purpose of holding and firing the independent electronic flash device.

Although prior art has disclosed electronic flash devices which would enable a photographer to fire a preliminary flash of light from such devices without causing the exposure of any film within a camera by virtue of the fact that said electronic flash devices are not physically combined with and do not require the involvement of a camera in order to fire a flash of light, the use of these devices by a photographer in conjunction with the subsequent and near simultaneous use of a camera incorporating an electronic flash device does not offer a workable or practical solution to the lost picture phenomenon. This is so because use of electronic flash devices which are independent of any camera unit would require the photographer to hold and fire said electronic flash device with one hand while holding his camera with the other. In this arrangement, and unless either another individual were involved in the operation of the independent electronic flash device or unless a tripod was used to hold the camera in the correct plane of view, the photographer's ability to hold the camera steady in the correct plane of view necessary to obtain the desired photograph is severely compromised.

SUMMARY OF THE INVENTION

It is therfore an object of the invention to provide an improved camera equipped with two flash devices to avoid the shortcomings and limitations of all earlier devises of the subject type and insure that photographers using it will be better able to maximize the number of pictures of persons or groups of persons whose gazes are fixed toward the camera and the photographer.

Another object of the present invention is to provide a camera which will allow the photographer to emit a flash from the camera without causing any film within the camera to be exposed to light and to provide means for this flash to be activated or deactivated for use either in conjunction with or without the subsequent flash illumination of his subject or subjects in synchrony with the exposure of film.

The foregoing invention is believed to be an improvement over and distinguishable from all prior art because it allows one individual to operate both a preliminary flash unit in order to gain the attention of his human subject or subjects without the exposure of any film within his camera and affords means for insuring that the flash unit synchronized with the exposure of film will always be able to consistently provide artificial illumination immediately in time subsequent to the firing of the flash unit incorporated for the purpose of gaining the attention of a human subject or subjects.

Further distinguishing the present invention from prior art is its departure from the automatic sequencing of conditioning flashes of light with the flash of light synchronized to coincide, in time, with the exposure of film. Should the independent operator controlled mechanism which provides means for providing an flash of light for the purpose of orienting the gaze of a human subject or subjects fail to achieve the desired result, the photographer remains in control of the exposure or non exposure of film and may choose not to trigger the mechanism which causes the emission of another electronically generated flash of light synchronized to coincide, in time, with the exposure of film.

In contrast to the limited and restrictive methods currently available to ameliorate against the lost picture phenomenon, the photographer utilizing both of the electronic flash units incorporated in the present invention to orient the gaze of a human subject or subjects and to capture their image on photographic film while their gaze is in the direction of the camera may do so without the use of a tripod or the assistance of another individual. In addition, said photographer is free to move about the subject, thereby changing the plane of view of his camera and further enhance his ability to avoid the lost picture phenomenon without having to change the position of his hands on the camera.

DESCRIPTION OF THE PREFERRED EMBODIMENTS

Figure 1:
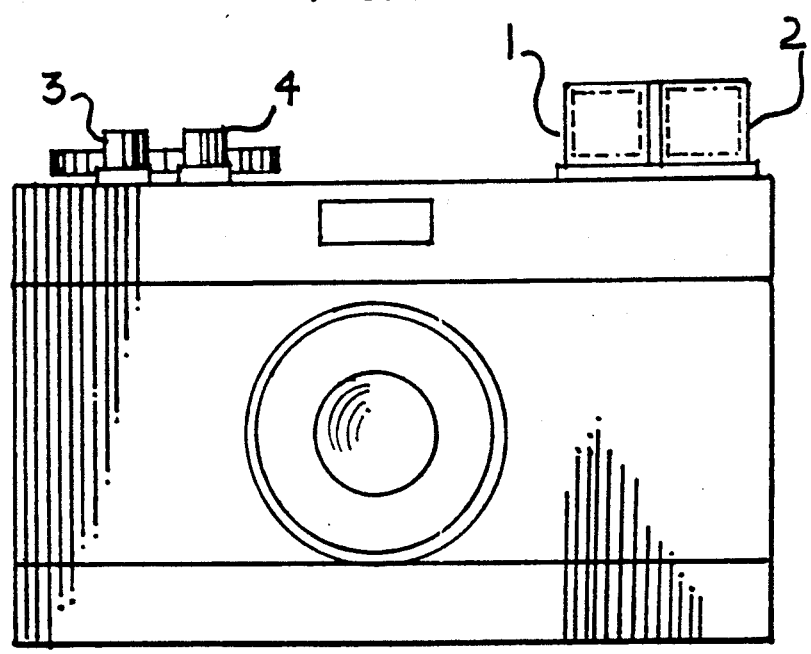
FIG. 1 is a front perspective of a camera according to one embodiment of the present invention.

Referring to the drawing, FIG. 1 shows a camera body capable of photography either in a daylight or flashlight photographic condition. By pressing the release button 3, daylight photography may be performed without the emission of light from either flash bulbs 1 or 2. In this manner the light occlusive container known as a camera and which consists of the essential elements of a lens, shutter, diaphragm, viewfinder, and a device for holding the film in the correct image plane and for advancing, rewinding, and changing the film can operate at times when daytime illumination is sufficient to obviate the need for artificial flash illumination.

Figure 3:
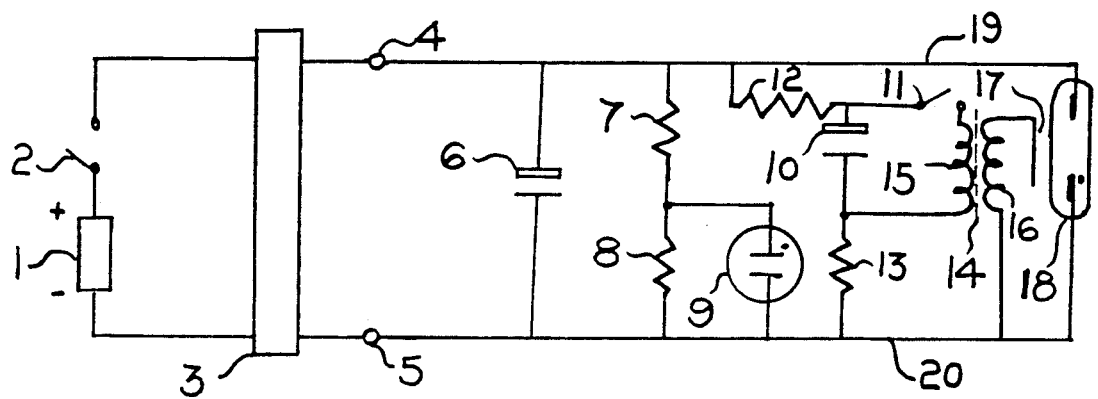
FIG. 3 is a circuit diagram of an electronic flash unit in accord with either of the present invention's electronic flash units.

Referring to FIG. 1, flash and shutter release button 4 provides a means for release (i.e. opening and closing) of the shutter independent of the operation of the electronic flash tube 2, the activation of the circuit for which is set forth in the description of FIG. 3. The light emitting portions of flashlamps 1 and 2 are shown. Orienting flash activation button 3 controls a switch contact for the firing of flash lamp 1 and flash activation and flash and shutter release button 4 controls a switch contact for the firing of flash lamp 2 in synchrony with the opening and closing of the shutter.

Figure 2:
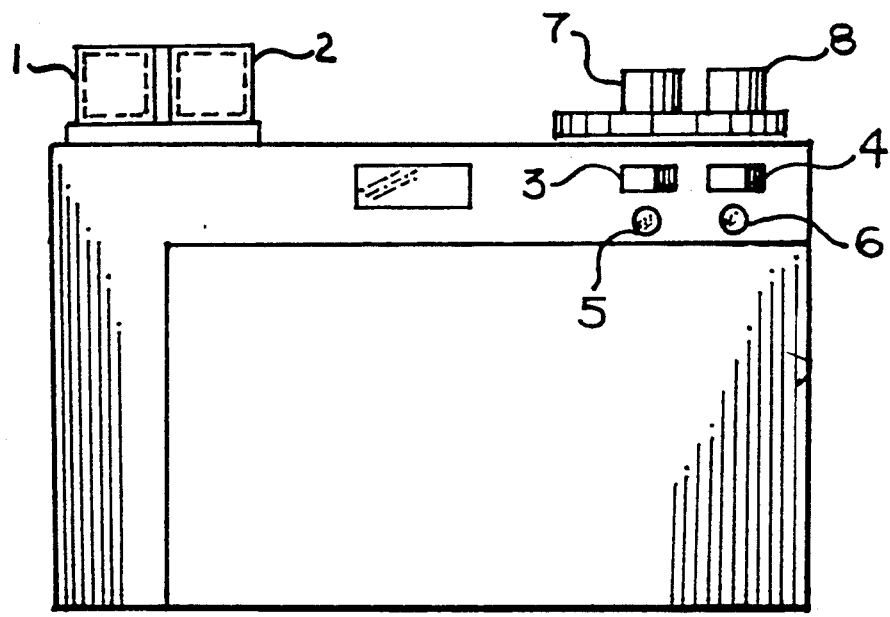
FIG. 2 is a rear perspective of a camera according to one embodiment of the present invention.

Referring to FIG. 2, the circuitry for flash tube 2 is energized by means of single pole switch 4. By flipping switch 3 to the on position the circuitry for flash lamp 1 is similarly energized. Th capacity of flash lamp 1 to fire will be indicated by ready light indicator lamp 5. In this manner, conventional flash photography can be affected by the depression of flash activation and shutter release button 7. In addition, the energizing of the circuit for flash lamp 2 may be accomplished by flipping switch 4 to an on position. The capacity of flash lamp 2 to fire will be indicated by ready light indicator lamp 6.

Referring to FIG. 3, a circuit is shown for use in both of the electronic flash units of the present invention. It is contemplated that independent circuitry will exist for each of said units. This circuit consists of a battery 1 which is connected to DC converter 3 by a single pole switch 2. The DC converter 3, shown in block form, steps up the relatively low voltage of the batteries to 300 to 350 volts in a manner well known in the art. It has a positive terminal 4 and a negative terminal 5. Positive terminal 4 is connected to the annode of a flash lamp tube 18 via line 19. Line 19 also connects the positive pole of DC voltage supply 3 with one terminal of storage capacitor 6 and one terminal of storage capacitor 10. The negative pole of the DC voltage supply 3 is connected directly to the cathode of the flash lamp tube 18 via line 20. Line 20 also connects to the other terminals of storage capacitors 6 and 10 and the secondary winding of ignition transformer 14. An indicator light 9 is connected to the positive terminal of the DC voltage supply 3 via line 19. The negative terminal of the DC voltage supply 3 connects to the indicator light 9 via line 20. Resistors 7 and 8 form a voltage divider across the main storage capacitor. Capacitor 10, connected to the DC voltage supply 3 via lines 19 and 20, is charged by resistors 12 and 13.

The ignition circuit for flash lamp tube 18 consists of a switch contact 11, ignition transformer 14, primary winding 15, secondary winding 16, ignition electrode 17, and capacitor 10. The ignition circuit operates as follows:

When switch 2 is closed the flash tube circuit is energized, charging capacitors 6 and 10 to a determined voltage via lines 19 and 20 from the positive and negative poles of the DC voltage supply 3. A voltage of 60 and 70 volts will appear across neon indicator lamp 9 and cause it to light when voltage across capacitor 6 reaches 300 volts. Simultaneously, ignition capacitor 10 has become charged through the voltage divider consisting of resistors 12 and 13.

With regard to the operation of the flash unit incorporated for the purpose of orienting human subjects, it is contemplated that after the circuitry has been energized as described above, that the switch contact 11 is closed through manual depression of flash activation button 7 as shown in FIG. 2. Ignition capacitor 10 can now discharge into the primary winding 15 of the ignition transformer 14 and through the secondary 16 to about 4,000 to 6,000 volts which flows through ignition electrode 17 and ionizes the gas within flash tube 18. This, in turn makes the xenon gas within the flash tube 18 sufficiently conductive to precipitate the discharge of the current from capacitor 6 and emit a flash of light from flash tube 18.

Similarly, and with regard to the flash unit incorporated for the purpose of providing a flash of light in synchrony with the opening and closing of the shutter, it is contemplated that after the circuitry has been energized as described above, that the switch contact 11 is closed through manual depression of flash activation shutter release button 8 as shown in FIG.2. Ignition capacitor 10 can now discharge into the primary winding 15 of the ignition transformer 14 and through the secondary 16 to about 4,000 to 6,000 volts which flows through ignition electrode 17 and ionizes the gas within flash tube 18. This, in turn makes the xenon gas within the flash tube 18 sufficiently conductive to precipitate the discharge of the current from capacitor 6 and a flash of light from flash tube 18. At that moment in time the flash fires and the shutter opens and closes in synchrony with the flash in a manner well known in the art.

While the invention has been illustrated and described as embodied in particular types of circuitry and the embodiment of the physical design of said invention, it is not intended to be limited to the details shown, since various modifications and circuit and structural changes may be made within ordinary skill in the art without departing in any way from the spirit of the present invention.

Without further analysis, the foregoing will so completely show the nature of the invention that others may, by applying current knowledge, adapted for various applications without omitting features that from the standpoint of prior art, fairly constitute essential characteristics of the generic or specific aspects of this invention. Therefore, such adaptations are intended to be comprehended within the meaning and range of equivalence of the foregoing claims.

What is claimed is:

1. In photographic devices for recording still pictures with artificial illumination which include means for providing an electronically generated flash of light for in synchrony with the opening and closing of the shutter and the exposure of photographic film and means for indicating that an electronic flash unit is capable of generating a flash or successive flashes of electronically generated light, the improvement comprising:

means for providing an orienting flash of light to enhance the ability of the photographer to attract the attention of a human subject or human subjects and orient the gaze of said subject or subjects toward the photographer and the camera; and means for consistently insuring generation of another electronically generated flash of light in synchrony with the opening and closing of the shutter and the exposure of photographic film immediately in time subsequent to the emission of said orienting flash of light.

2. The invention, as defined in claim 1, in which the improvement comprises an independently functioning manually operator activated means for providing an electronically generated flash of light to enhance the ability of the photographer to attract the attention of a human subject or human subjects and orient the gaze of said subject or subjects toward the photographer and the camera, 3. The invention, as defined in claim 1, in which the improvement comprises means for effecting the emmision of a flash of light for the purpose of enhancing the ability of the photographer to obtain the attention of a human subject or members of a group of human subjects without the triggering of any automatic mechanism or mechanisms which would cause the shutter mechanism of the camera to open or the film within the camera to be exposed to light from the human subject or subjects.

4. The invention, as defined in claim 1, in which the improvement is functionally operable devoid of the need for any physical stabilization by mechanical means of holding the camera in a fixed plane of view.

5. The invention, as defined in claim 1, in which the improvement is functionally operable devoid of the need for any human assistance to the operator.

6. The invention, as defined in claim 1, in which the improvement is functionally operable devoid of the need for any change in the position of the operators hands on the camera.

7. An improved method within the realm of photographic devices for recording still pictures of a human subject or subjects, said method comprising independently functioning manually operated means for providing an electronically generated flash of light for orienting the gaze or gazes of a human subject or members within a group of human subjects, independently functioning manually operated means for consistently providing another electronically generated flash of light in synchrony with the opening and closing of the shutter and the exposure of photographic film immediately in time subsequent to the emission of said electronically generated orienting flash of light, and separate means for indicating whether the device is capable of generating the said orienting flash and the said flash of electronically generated light synchronized with the opening and closing of the shutter and the exposure of photographic film.

* * * * *